(12) United States Patent
Wang

(10) Patent No.: US 9,823,772 B2
(45) Date of Patent: Nov. 21, 2017

(54) SENSING DEVICE

(71) Applicant: Nuvoton Technology Corporation, Hsinchu (TW)

(72) Inventor: Cheng-Chih Wang, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 18 days.

(21) Appl. No.: 15/045,227

(22) Filed: Feb. 16, 2016

(65) Prior Publication Data

US 2016/0239147 A1 Aug. 18, 2016

Related U.S. Application Data

(60) Provisional application No. 62/116,934, filed on Feb. 17, 2015.

(30) Foreign Application Priority Data

Oct. 20, 2015 (TW) .................................. 104134396

(51) Int. Cl.
 *G06F 3/045* (2006.01)
 *G06F 3/041* (2006.01)
 *G06F 3/044* (2006.01)
 *G06F 3/0354* (2013.01)

(52) U.S. Cl.
 CPC ........ *G06F 3/0416* (2013.01); *G06F 3/03547* (2013.01); *G06F 3/044* (2013.01)

(58) Field of Classification Search
 CPC ..... G06F 3/03547; G06F 3/0416; G06F 3/044
 See application file for complete search history.

(56) References Cited

U.S. PATENT DOCUMENTS

| 2007/0159184 | A1 | 7/2007 | Reynolds et al. |
| 2010/0315102 | A1* | 12/2010 | Portmann ............. G06F 3/0416 324/680 |
| 2014/0049510 | A1* | 2/2014 | Chung .................. G06F 3/0416 345/174 |

FOREIGN PATENT DOCUMENTS

| CN | 103324367 A | 9/2013 |
| TW | 201430659 A | 8/2014 |
| TW | 201432533 A | 8/2014 |
| TW | 201439842 A | 10/2014 |
| TW | 201525794 A | 7/2015 |

* cited by examiner

*Primary Examiner* — Insa Sadio
(74) *Attorney, Agent, or Firm* — CKC & Partners Co., Ltd.

(57) ABSTRACT

A sensing device includes a comparator, a first switch, a second switch, and a controller. The comparator includes a first input end and a second input end. An end of the first switch is connected to one of a first touch electrode and a second touch electrode that are complementary. An end of the second switch is selectively connected to the second touch electrode. When the first touch electrode and the second touch electrode are touched, the controller controls the first switch to connect the first input end and the first touch electrode, controls the second switch to connect the second input end and the second touch electrode, and calculates a first touch position of the first touch electrode and the second touch electrode.

8 Claims, 4 Drawing Sheets

SENSING DEVICE

RELATED APPLICATIONS

This application claims priority to Taiwanese Patent Application Serial Number 104134396, filed Oct. 20, 2015, and claims priority to U.S. provisional application Ser. No. 62/116,934, filed Feb. 17, 2015, the disclosure of which is hereby incorporated by reference herein in its entirety.

BACKGROUND

Field of Disclosure

The present disclosure relates to a sensing device. More particularly, the present disclosure relates to a sensing device for sensing a touch slider.

Description of Related Art

Since touch sensing interface is more intuitive than traditional interface with mechanical buttons, the touch sensing interface can enhance the user experience. In recent years, lots of R & D resources have been invested in the field of touch panel, so manufacturing cost of touch panel is reduced, and it leads to more and more electronic products using touch panel as the user interface, thus further increased the demand for touch sensing devices.

In the applications of user interface, a slider is commonly used in the need of continuously adjusting the values, and if a slider function is implemented by a touch manner, it needs to get a pinpoint of the touch sensing device where the user touched. Traditional touch slider is typically implemented by multiple touch buttons, and the touch buttons are scanned in sequence to calculate a touch position of the user by an interpolation method. However, when a higher accuracy is required, an amount of the touch buttons will need to be extremely increased, which results in increase in manufacturing cost. Furthermore, in the manufacturing process of the traditional touch slider, the touch buttons must be controlled to have about the same self-capacitances, or the control accuracy of the traditional touch slider may be greatly reduced. In addition, increasing the number of touch buttons also further raise the difficulty in controlling the self-capacitance of each of the touch buttons, thereby further increasing the manufacturing cost.

SUMMARY

The present disclosure is to provide a sensing device with a high-precision touch slider with low manufacturing cost. The sensing device includes a comparator, a first switch, a second switch and a controller. The comparator includes a first input end and a second input end. An end of the first switch is connected to the first input end, and the other end of the first switch is connected to one of a first touch electrode and a complementary second touch electrode; an end of the second switch is connected to the second input end, and the other end of the second switch is selectively connected to the second touch electrode. The controller is configured to control the first switch and the second switch. When the first touch electrode and the second touch electrode are touched, the controller controls the first switch to connect the first input end and the first touch electrode, controls the second switch to connect the second input end and the second touch electrode, and calculates a first touch position of the first touch electrode and the second touch electrode.

In one exemplary embodiment, the sensing device further includes at least one variable capacitor unit which is electrically connected to at least one of the first input end and the second input end, and is electrically connected to the controller. The variable capacitor unit is configured to receive at least one adjusting signal from the controller, and adjusting an equivalent capacitance of the variable capacitor unit based on the adjusting signal, and the controller is configured to calculate the first touch position based on the equivalent capacitance of the variable capacitor unit.

In one exemplary embodiment, the variable capacitor unit includes a plurality of switchable capacitors, and the switchable capacitors are connected to each other in parallel, one end of each of the switchable capacitors is configured for selectively receiving the adjusting signal, and the other ends of the switchable capacitors are commonly connected to at least one of the first input end and the second input end.

In one exemplary embodiment, the variable capacitor unit also receives a driving signal from the controller, for charging at least one of the first input end and the second input end by the driving signal.

In one exemplary embodiment, the widths of the first touch electrode and the second touch electrode are not uniformly distributed, and the controller is configured for calculating the first touch position based on the widths of the first touch electrode and the second touch electrode.

In one exemplary embodiment, the controller controls the first switch to electrically connect the first input end and the first touch electrode and to the second touch electrode alternately, and controls the second switch to disconnect the second input end and the second touch electrode, for determining touch states of the first touch electrode and the second touch electrode.

In one exemplary embodiment, the sensing device further includes a third switch, an end of the third switch is connected to the second input end, and the other end of the third switch is selectively connected to the first touch electrode, the controller is configured to control the first switch to connect the first input end and the second touch electrode, control the second switch to disconnect the second input end and the second touch electrode, control the third switch to connect the second input end and the first touch electrode, and calculate a second touch position of the first touch electrode and the second touch electrode, to adjust the first touch position based on the second touch position.

The present disclosure is also to provide a sensing method. The method includes the following steps: controlling a first switch by a controller, to connect a first input end of the comparator and one of a first touch electrode and a complementary second touch electrode, and controlling the second switch to selectively connect a second input end of the comparator and the second touch electrode; when the first touch electrode and the second touch electrode are touched, controlling the first switch by the controller to connect the first input end and the first touch electrode, and controlling the second switch to connect the second input end and the second touch electrode, and calculating a first touch position of the first touch electrode and the second touch electrode.

In one exemplary embodiment, the step of calculating the first touch position includes: receiving at least one adjusting signal from the controller by at least one variable capacitor unit, and adjusting an equivalent capacitance of the variable capacitor unit based on the adjusting signal, wherein the variable capacitor unit is electrically connected to the controller, and is electrically connected to at least one of the first input end and the second input end; and calculating the first touch position by the controller based on the equivalent capacitance of the variable capacitor unit.

In one exemplary embodiment, the step of adjusting the equivalent capacitance of the variable capacitor unit based on the adjusting signal includes: selectively receiving the adjusting signal by one end of each of a plurality of switchable capacitors which are connected to each other in parallel, wherein the other ends of the switchable capacitors are commonly connected to at least one of the first input end and the second input end.

By applying the sensing device and sensing method of the present disclosure, only a few touch electrodes are required to achieve touch operations with high precision, therefore both the manufacturing cost and the size of the touch sensing device are reduced, making the electronic components smaller and lighter while further enhancing user experience.

The present disclosure is to provide a simplified summary of the disclosure, so that the reader of this disclosure has a basic understanding. It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
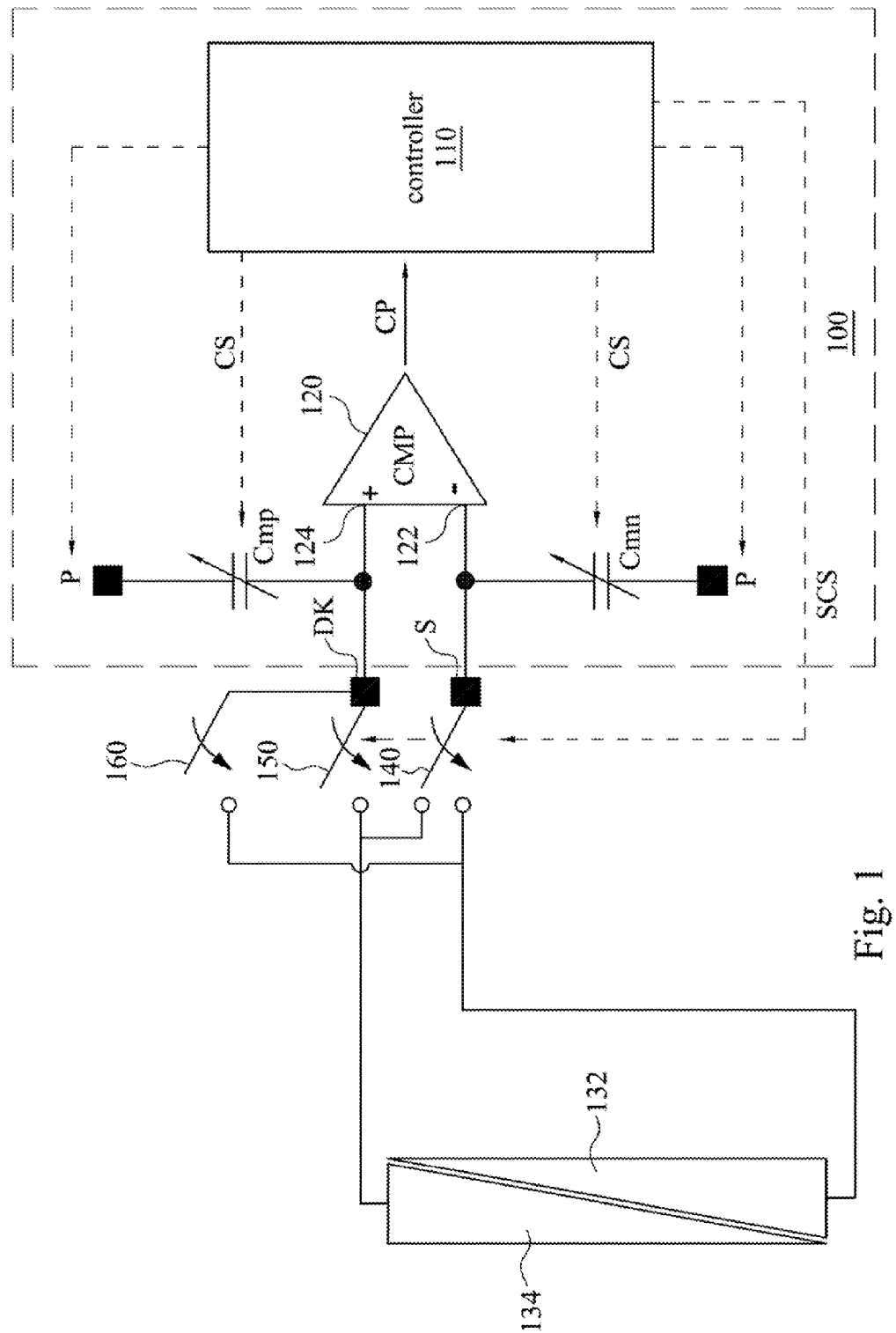
FIG. 1 is a diagram illustrating a sensing device according to a first exemplary embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Certain terms are used throughout the following description and claims, which refer to particular components. As one skilled in the art will appreciate, electronic equipment manufacturers may refer to a component by different names. This document does not intend to distinguish between components that differ in name but not in function.

As used herein, "about", "approximately" or "around" describe amounts which are subject to slight variations in the actual value but such variations do not have material impact. Unless otherwise noted in the embodiment, the amounts described by "about", "around" or "approximately" typically have a level of tolerance of under twenty percent, or, better, under ten percent, or, better still, under five percent.

In the following description and in the claims, the terms "include" and "comprise" are used in an open-ended fashion, and thus should be interpreted to mean "include, but not limited to . . . " Also, the term "couple" is intended to mean either an indirect or direct electrical connection. Accordingly, if one device is coupled to another device, that connection may be through a direct electrical connection, or through an indirect electrical connection via other devices and connections.

The terms "first", "second", . . . etc., in the article do not refer to any specific order, nor intended to limit the present disclosure, it is only used for distinguishing the differences between components or operations with the same technological descriptions.

The term "couple" or "connected" is intended to mean two or more elements that are either in an indirect or direct electrical connection, while "coupled" may also refer to two or more elements can control or operate each other.

FIG. 1 is a diagram illustrating a sensing device according to a first exemplary embodiment of the present disclosure. As shown in FIG. 1, the sensing device 100 can be configured for sensing the touch positions of the touch electrodes, and executing corresponding functions and/or operations (e.g., control the subsequent circuits, output digital data signals) based on the sensing results. Specifically, users touch a touch slider, and a touch slider includes more than two touch electrodes. The sensing device 100 is electrically connected to the touch electrodes under the touch slider, and when a user touches the touch slider, more than two touch electrodes will be touched. In this way, the sensing device 100 can get the position which is touched by the user through the electric characteristic information of the touch electrodes, to execute corresponding functions and/or operations based on the touched position. In the exemplary embodiment in FIG. 1, the sensing device 100 is electrically connected to the first touch electrode 132 and the second touch electrode 134. It is noted that people have ordinary skills in this filed can change the numbers of the touch electrodes connected to the sensing device 100 based on the design requirement; that is, the number of the touch electrodes is not meant to be a limitation of the present disclosure.

The sensing device 100 includes a controller 110, a comparator 120, a first switch 140 and a second switch 150. The comparator 120 includes a first input end 122 and a second input end 124. An end of the first switch 140 connects to the first input end 122, and another end of the first switch 140 is connected to one of a first touch electrode 132 and a second touch electrode 134 which are complementary to each other. An end of the second switch 150 is connected to the second input end 124, and another end of the second switch 150 selectively is connected to the second touch electrode 134. The controller 110 controls the first switch 140 and the second switch 150. When the first touch electrode 132 and the second touch electrode 134 are touched, the controller 110 controls the first switch 140 to connect the first input end 122 and the first touch electrode 132, controls the second switch 150 to connect the second input end 124 and the second touch electrode 134, for calculating a first touch position of the first touch electrode 132 and the second touch electrode 134.

The controller 110 transmits a switch control signal SCS to the first switch 140 and the second switch 150 for controlling the switch states; in one exemplary embodiment, the controller 110 is a microcontroller, the first switch 140 is a three-way switch, and the second switch 150 is a two-way switch. In another exemplary embodiment, the controller 110 is a central processor, the first switch 140 is achieved by two two-way switches, and the second switch 150 is a two-way switch. People have ordinary skills in this field can accomplish the aforementioned elements by using other electric elements; that is, the aforementioned description is not meant to be a limitation of the present disclosure.

The first touch electrode 132 and the second touch electrode 134 are complementary to each other, in this exemplary embodiment, the first touch electrode 132 and the second touch electrode 134 are both triangular electrodes, and their arrangement positions are symmetrical and the two self capacitances of the two electrodes are about the same. People have ordinary skills in this field can uses touch electrode with other shapes, such as touch electrode with rectangular shape, chevron shape, and other shapes; that is, the aforementioned description is used for illustrative purposes only and does not meant to be a limitation of the present disclosure.

When the user touches the touch slider, both the first touch electrode 132 and the second touch electrode 134 will be touched at the same time, and the capacitance of the first touch electrode 132 and the capacitance of the second touch electrode 134 which correspond to the touch position of the first touch electrode 132 and the second touch electrode 134 will be changed, the first input end 122 or the second input end 124 of the comparator 120 is electrically connected to the first touch electrode 132 or the second touch electrode 134, therefore the voltage levels of the input ends of the comparator 120 will also be changed accordingly, and the controller 110 is configured for receiving an output signal CP of the comparator 120, to detect the changes of the voltage levels at the input ends of the comparator 120, for measuring the variations of the capacitances and for determining the touch position.

When measuring the capacitance variations, the controller 110 controls the first switch 140 to connect the first input end 122 and the first touch electrode 132, and controls the second switch 150 to connect the second input end 124 and the second touch electrode 134. At this time, the first input end 122 and the second input end 124 of the comparator 120 are respectively connected to the first touch electrode 132 and the complementary second touch electrode 134. Since the first touch electrode 132 and the second touch electrode 134 are complementary to each other, the received noises will be the same. When the controller 110 measures the capacitance variations, the noise on the first touch electrode 132 and the noise on the second touch electrode 134 can be counterbalanced by each other, to further promote the measurement accuracy, for achieving a precision which is multiple of the precision of a traditional touch slider with a plurality of touch buttons. Using a touch slider with the same length as an example, the traditional touch slider with a plurality of touch buttons can only achieve a control of about 30 levels; however, if the sensing device of the present disclosure is used, it can provide a control of 70 to 80 levels. In this way, only a few touch electrodes of the touch slider will be required to achieve the accurate control, which reduces the area of the sensing device 100 and provides a better user experience with a lower cost.

In one exemplary embodiment, the sensing device 100 further includes a variable capacitor unit Cmn and a variable capacitor unit Cmp, both variable capacitor units are electrically connected to the controller 110, for receiving an adjusting signal CS from the controller 110, each of the variable capacitor unit Cmn and the variable capacitor unit Cmp adjusts an equivalent capacitance based on the adjusting signal CS. In this exemplary embodiment, the variable capacitor unit Cmn is electrically connected to the first input end 122, and the variable capacitor unit Cmp is electrically connected to the second input end 124, the controller 110 adjusts an equivalent capacitance of the variable capacitor unit Cmn and an equivalent capacitance of the variable capacitor unit Cmp, and gets a capacitance variation of the first touch electrode 132 and the second touch electrode 134 due to the touch of users based on the equivalent capacitances of both the variable capacitor unit Cmn and the variable capacitor unit Cmp, for calculating a first touch position of the first touch electrode 132 and the second touch electrode 134. The following descriptions will disclose the details of calculating the capacitance variations of the first touch electrode 132 and the second touch electrode 134 and the details of calculating the first touch position.

In one exemplary embodiment, the variable capacitor unit Cmn and the variable capacitor unit Cmp receive a driving signal P from the controller 110, for charging the first input end 122 and the second input end 124 by the driving signal P. The variable capacitor unit Cmn and the variable capacitor unit Cmp receive the same driving signal P from the controller 110, therefore the received noises of the variable capacitor unit Cmn and the variable capacitor unit Cmp can be counterbalanced.

Figures 2A, 2B, 2C:
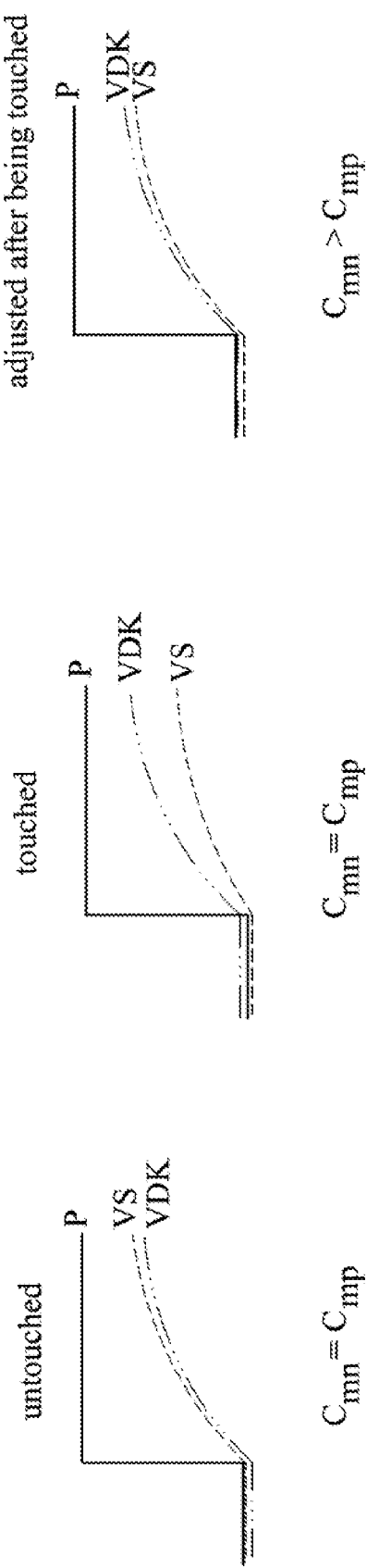
FIG. 2A to FIG. 2C are diagrams illustrating the variations of the capacitances and variations of the voltage levels of the sensing device in FIG. 1.

FIG. 2A to FIG. 2C are diagrams illustrating the variations of the capacitances and variations of the voltage levels of the sensing device in FIG. 1. Specifically, as shown in FIG. 1 and FIG. 2A to FIG. 2C, for example, if the variable capacitor units Cmn and Cmp have predetermined same equivalent capacitances, when the first touch electrode 132 and the second touch electrode 134 do not act, (e.g., the first touch electrode 132 and the second touch electrode 134 are not touched), the voltage level VS (i.e., the voltage level of the first input end 122) and the voltage level VDK (i.e., the voltage level of the second input end 124) can be charged to the same voltage level or to the voltage level about the same by the variable capacitor units Cmn and Cmp and the driving signal P (as shown in FIG. 2A).

In one exemplary embodiment, the controller 110 controls the first switch 140 to enable the first input end 122 to be electrically connected to the first touch electrode 132 and the second touch electrode 134 alternately, and controls the second switch 150 to disconnect the second input end 124 and the second touch electrode 134, for determining touch states of the first touch electrode 132 and the second touch electrode 134, for example, a sequential period which the controller 110 controls the switch state of the first switch 140 is several microseconds. Specifically, when the first touch electrode 132 and the second touch electrode 134 are operated (e.g., the first touch electrode 132 and the second touch electrode 134 are touched by fingers or a stylus), capacitances at ends of the first touch electrode 132 and the second touch electrode 134 which are connected to the first input end 122 will be changed, so as to reduce the voltage level VS to be lower than the voltage level VDK (as shown in FIG. 2B). The controller 110 can detect a drop of the voltage level of the first input end 122 by the comparator output signal CP output from the comparator 120, to further determine that the first touch electrode 132 and the second touch electrode 134 are touched.

When the controller 110 determines that the first touch electrode 132 and the second touch electrode 134 are touched, the controller 110 controls the first switch 140 to connect the first input end 122 with the first touch electrode 132, controls the second switch 150 to connect the second input end 124 with the second touch electrode 134, so that the variable capacitor unit Cmn can be adjusted based on the comparator output signal CP generated based on the comparison of the voltage level VS and the voltage level VDK (e.g., after the adjustment, the variable capacitor unit Cmn can have an equivalent capacitance which is larger than that of the variable capacitor unit Cmp), thereby further executing voltage compensation to the first input end 122 to make the voltage level VS to increase (or decrease) again for being the same or about the same as the voltage level VDK (as shown in FIG. 2C), wherein the aforementioned variations of the voltage levels or variations of the of the capacitances can be used in the following data operating process, to determine the position which is touched by users, or to execute corresponding touching functions accordingly.

In other exemplary embodiments, it can be the variable capacitor unit Cmp configured to be adjusted based on the comparator output signal CP generated based on the comparison of the voltage level VS and the voltage level VDK (e.g., after the adjustment, the variable capacitor unit Cmp can have an equivalent capacitance which is smaller than that of the variable capacitor unit Cmn), thereby executing voltage compensation to the second input end 124 to make the voltage level VDK to increase (or reduce) for being the same or about the same as the voltage level VS. Alternatively, in other exemplary embodiments, the variable capacitor unit Cmp and the variable capacitor unit Cmn can be respectively adjusted based on the comparator output signal CP generated based on the comparison of the voltage level VDK and the voltage level VS, thereby executing voltage compensation to the second input end 124 and the first input end 122, for making the voltage level VDK and the voltage level VS to be the same or about the same after the voltage compensation.

The controller 110 is configured to receive the comparator output signal CP to generate the control signal CS for controlling the variable capacitor unit Cmn, to adjust an equivalent capacitance of the variable capacitor unit Cmn, for allowing the variable capacitor unit Cmn executing voltage compensation to the first input end 122 correspondingly. In other exemplary embodiments, the control signal CS can also be configured for adjusting an equivalent capacitance of the variable capacitor unit Cmp, to allow the variable capacitor unit Cmp executing voltage compensation to the second input end 124 correspondingly. In some further exemplary embodiments, the control signal CS can be configured to respectively adjust the equivalent capacitances of the variable capacitor unit Cmp and of the variable capacitor unit Cmn, to allow the variable capacitor unit Cmp and the variable capacitor unit Cmn executing voltage compensation to the second input end 124 and the first input end 122 correspondingly.

In the exemplary embodiments of the present disclosure, "voltage compensation" can mean increasing the voltage level of the input end of the comparator, it can also means reducing the voltage level of the input end of the comparator; that is, the voltage levels of the input ends of the comparator can be increased/reduced after voltage compensation.

After the voltage compensation, the controller 110 can calculate a capacitance difference between the first touch electrode 132 and the second touch electrode 134 based on an equivalent capacitance difference between the variable capacitor unit Cmp and the variable capacitor unit Cmn. The following description will use the exemplary embodiment in FIG. 1 as an example, in this exemplary embodiment, when the user does not touch the first touch electrode 132 and the second touch electrode 134, self capacitances of the first touch electrode 132 and of the second touch electrode 134 are about the same, when the user touches the first touch electrode 132 and the second touch electrode 134, both the equivalent capacitances of the first touch electrode 132 and of the second touch electrode 134 will increase simultaneously, but the increasing amount of the equivalent capacitance of the first touch electrode 132 is different from that of the second touch electrode 134, due to the geometric configuration herein, the higher the touch position of users, the more the increasing amount of the equivalent capacitance of the first touch electrode 132, and the less the increasing amount of the equivalent capacitance of the second touch electrode 134, therefore, the controller 110 can calculate the first touch position based on the difference of the equivalent capacitances of the first touch electrode 132 and of the second touch electrode 134.

For instance, when the user's touch position is close to the upper edge of the second touch electrode 134 (i.e., closer to the wider portion of the second touch electrode 134), since the capacitance is proportional to the area and is inversely proportional to the distance, the increasing amount of the equivalent capacitance of the second touch electrode 134 is greater than that of the equivalent capacitance of the first touch electrode 132, when the user's touch position is close to the lower edge of the second touch electrode 134 (i.e., closer to the thinner portion of the second touch electrode 134), the increasing amount of the equivalent capacitance of the second touch electrode 134 is smaller than that of the equivalent capacitance of the first touch electrode 132, making the equivalent capacitance of the second touch electrode 134 lower than the equivalent capacitance of the first touch electrode 132. The controller 110 transmits the control signal CS to the first variable capacitor unit Cmn and to the second variable capacitor unit Cmp for executing the voltage compensation, then obtains a difference between the equivalent capacitances of the first touch electrode 132 and the second touch electrode 134 by a difference between the equivalent capacitances of the first variable capacitor unit Cmn and the second variable capacitor unit Cmp, so as to calculate the first touch position.

It is noted that in the exemplary embodiment in FIG. 1, a width of the first touch electrode 132 and a width of the second touch electrode 134 are not uniformly distributed, for enlarging the difference between the equivalent capacitances of the first touch electrode 132 and of the second touch electrode 134, then the controller 110 further calculates the first touch position based on the width information of the first touch electrode 132 and the second touch electrode 134. In this way, the present disclosure uses only two electrodes to accomplish a touch slider with high precision, at the same time the difficulty of the manufacturing process is reduced while the cost is saved since the requirement amount of the electrodes is lessened.

Figure 3:
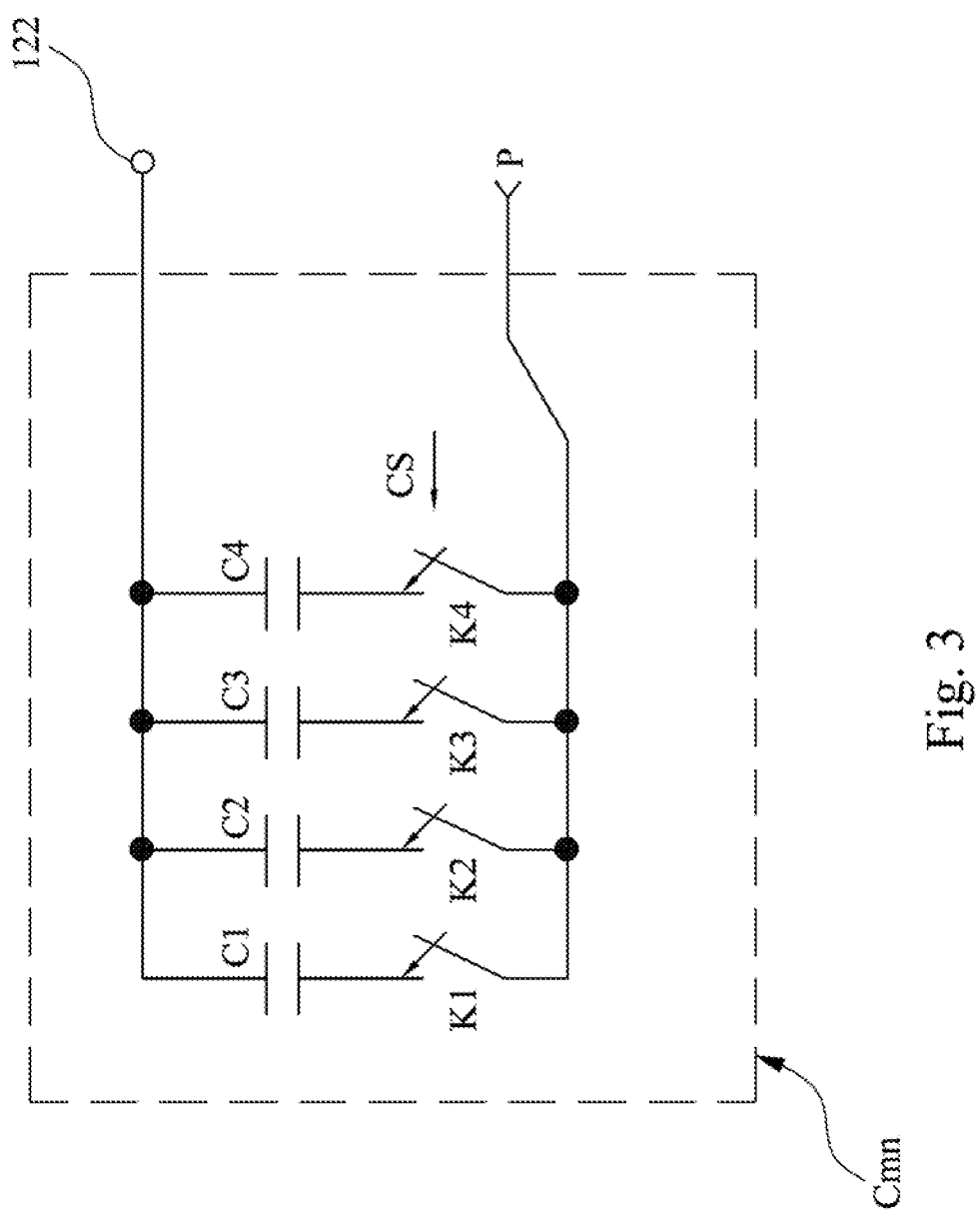
FIG. 3 is a diagram illustrating the variable capacitor unit Cmn in FIG. 1 according to an exemplary embodiment of the present disclosure.

FIG. 3 is a diagram illustrating the variable capacitor unit Cmn in FIG. 1 according to an exemplary embodiment of the present disclosure. As shown in FIG. 1 and FIG. 3; the variable capacitor unit Cmn includes a plurality of switchable capacitors (i.e., switchable capacitors C1, C2, C3, and C4), and the switchable capacitors C1, C2, C3, and C4 are connected to each other in parallel, wherein each of the switchable capacitors C1, C2, C3, and C4 has an end configured for selectively receiving a driving signal P, and other ends of the switchable capacitors C1, C2, C3, and C4 are commonly connected to the first input end 122.

In some exemplary embodiments, when the controller 110 outputs the control signal CS to the variable capacitor unit Cmn, each of the switches K1, K2, K3 and K4, which correspond to the switchable capacitors C1, C2, C3, and C4 respectively, can be switched to an on-state or an off-state based on the control signal CS, thereby turning the switchable capacitors C1, C2, C3, and C4 on or off accordingly, thus adjusting the equivalent capacitance of the variable capacitor unit Cmn based on the control signal CS. In addition, the aforementioned descriptions of the variable capacitor unit Cmn can also be applied on the variable capacitor unit Cmp. Besides, people have ordinary skills in this field can use other electric elements to accomplish the variable capacitor units Cmn and Cmp, the aforementioned descriptions are used for illustrative purposes only and do not meant to be a limitation of the present disclosure.

In some further exemplary embodiments, the sensing device 100 further includes a third switch 160, an end of the third switch 160 is connected to the second input end 124, and another end of the third switch 160 selectively is connected to the first touch electrode 132. After the controller 110 calculates the first touch position, the controller 110 controls the first switch 140 to connect the first input end 122 and the second touch electrode 134, controls the second switch 150 to disconnect the second input end 124 and the second touch electrode 134, controls the third switch 160 to connect the second input end 124 and the first touch electrode 132, and then calculates a second touch position of the first touch electrode 132 and the second touch electrode 134, to adjust the first touch position based on the second touch position.

In the aforementioned operations, the controller 110 transmits the switch control signal SCS to the first switch 140, the second switch 150 and the third switch 160, so as to electrically connect the first input end 122 with the second touch electrode 134, and electrically connect the second input end 124 with the first touch electrode 132; that is, the controller 110 interchanges the electric connections of the input ends of the comparator 120 and the touch electrodes (including the first touch electrode 132 and the second touch electrode 134), and calculates the second touch position by the aforementioned calculating method of the first touch position, then uses the second touch position to adjust the first touch position. For instance, the controller 110 calculates a mean position of the first touch position and the second touch position, people have ordinary skills of this field can use other manners to combine the first touch position and the second touch position; that is, the aforementioned descriptions are used for illustrative purposes only and do not meant to be a limitation of the present disclosure. By means of two times of measurements and the calculations, the controller 110 further promotes the precision of the touch slider. As described above, the sensing device 100 changes the connections between the first touch electrode 132, the second touch electrode 134 and the input ends of the comparator 120 by controlling the first switch 140 and the second switch 150, to promote the resolution of the touch positions of the touch slider. In this exemplary embodiment, by adding the third switch 160 to change the connections of the first touch electrode 132 and the second touch electrode 134 to the input ends of the comparator 120, the sensing device 100 can further double the control steps compared with the control steps of only applying the first switch 140 and the second switch 150.

From the aforementioned exemplary embodiments, by applying the aforementioned sensing device 100 to the touch sensing products, accurate touch operations of the touch slider can be achieved by limited circuit design (e.g., only two pins of the electrodes) and limited capacitors, to save the configurations of related circuit and capacitors, and further reduce the layout area of the circuit and capacitors, for decreasing the corresponding size of the touch sensing product. In addition, the difficulty of the manufacturing process is reduced while the cost is saved since the requirement amount of the electrodes is lessened.

Figure 4:
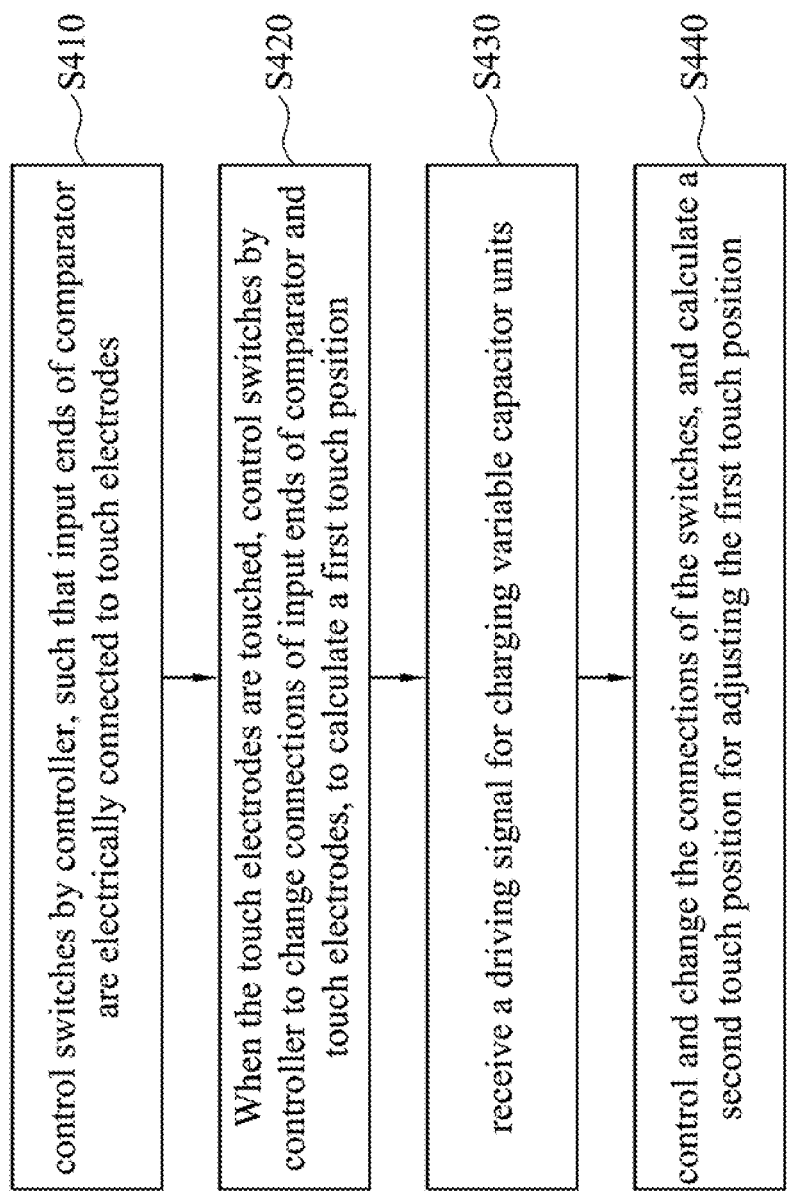
FIG. 4 is a flow chart of a sensing method according to an exemplary embodiment of the present disclosure.

FIG. 4 is a flow chart of a sensing method according to an exemplary embodiment of the present disclosure. The sensing method 400 includes several steps to use a few touch electrodes to precisely detect the touch position on the touch slider touched by users. To allow simple and clear explanation, the sensing device 100 in FIG. 1 will be used as an example below to illustrate the sensing method 400; however, it is not meant to be a limitation of the present disclosure. It should be appreciated that although the steps of the flowchart of the sensing method 400 has a specific order, it does not restrict the step sequence of the sensing method 400; in addition, the steps can be increased or decreased based on the actual requirement.

The sensing device 100 controls the first switch 140 by the controller 110, such that the first input end 122 is electrically connected to one of the first touch electrode 132 and the second touch electrode 134, and controls the second switch 150 by the controller 110, such that the second input end 124 of the comparator 120 is electrically connected to the second touch electrode 134 selectively (step S410). The controller 110 controls the second switch 150 to disconnect the second input end 124 and the electrode; therefore, when users touch the first touch electrode 132 and the second touch electrode 134, the electric characters of the second input end 124 would not be changed. The sensing device 100 is electrically connected to the first touch electrode 132 or the second touch electrode 134 through the first input end 122, and compares the voltage levels of the first input end 122 and the second input end 124 by the comparator 120, for detecting if the equivalent capacitances of the first touch electrode 132 and the second touch electrode 134 are changed or not. Since the implementation details have been disclosed above, further description is omitted for the sake of brevity.

In one exemplary embodiment, the sensing device 100 controls the first switch 140 by the controller 110, such that the first input end 122 is electrically connected to the first touch electrode 132 and the second touch electrode 134 sequentially, and controls the second switch 150 to disconnect the second input end 124 and the second touch electrode 134, for determining touch states of the first touch electrode 132 and the second touch electrode 134. Since the implementation details have been disclosed above, further description is omitted for the sake of brevity.

While the first touch electrode 132 and the second touch electrode 134 are touched, the sensing device 100 controls the first switch 140 by the controller 110, to connect the first input end 122 with the first touch electrode 132, and controls the second switch 150 to connect the second input end 124 with the second touch electrode 134, so as to calculate the first touch position of the first touch electrode 132 and the second touch electrode 134 (step S420). The sensing device 100 operates to electrically connect the first touch electrode 132 with the first input end 122 and electrically connect the second touch electrode 134 with the second input end 124, and then executes voltage compensation to the first touch electrode 132 and the second touch electrode 134. In this way, the noises received by the first touch electrode 132 and the second touch electrode 134 can be counterbalanced, and calculates the first touch position with high precision by the complementary configuration between the first touch electrode 132 and the second touch electrode 134.

In one exemplary embodiment, the sensing device 100 calculates the first touch position by the controller 110 based on the widths of the first touch electrode 132 and the second touch electrode 134, and a width of the first touch electrode 132 and a width of the second touch electrode 134 are not uniformly distributed. By using the first touch electrode 132 and the second touch electrode 134 with varying widths, when users touch the touch slider, the difference between the equivalent capacitances of the first touch electrode 132 and the second touch electrode 134 will be enlarged, for promoting the precision and the resolution of the touch sensing.

In one exemplary embodiment, when the sensing device 100 executes the steps for calculating the first touch position, the variable capacitor units Cmn and Cmp that are electrically connected to the first input end 122 and the second input end 124 of the comparator 120 respectively, receive the adjusting signal CS from the controller 110, to adjust the equivalent capacitances of the variable capacitor units Cmn and Cmp based on the adjusting signal CS, wherein the variable capacitor units Cmn and Cmp are electrically connected to the controller 110, and are electrically connected to at least one of the first input end 122 and the second input end 124. The controller 110 transmits the adjusting signal CS to the variable capacitor units Cmn and Cmp based on the output signal CP of the comparator 120. For instance, the controller 110 transmits the adjusting signal CS for adjusting the equivalent capacitances of the variable capacitor units Cmn and Cmp, such that the voltage level of the first input end 122 is the same as that of the second input end 124. The controller 110 calculates the difference between the equivalent capacitances of the first touch electrode 132 and the second touch electrode 134 based on the difference between the equivalent capacitances of the variable capacitor units Cmn and the Cmp, for calculating the first touch position accordingly. Since the details of the controller 110 adjusting the equivalent capacitances of the variable capacitor units Cmn and the Cmp and the details of calculating the first touch position have been disclosed as above, further description hence is omitted for the sake of brevity.

In another exemplary embodiment, in the step of adjusting the equivalent capacitances of the variable capacitor units Cmn and the Cmp, the sensing device 100 selectively receives the adjusting signal CS by one ends of a plurality of switchable capacitors connected to each other in parallel, for adjusting the equivalent capacitances of the variable capacitor units Cmn and the Cmp, and the other ends of the switchable capacitors are commonly connected to at least one of the first input end 122 and the second input end 124. Since the details have been disclosed as above, further description hence is omitted for the sake of brevity.

In one exemplary embodiment, the sensing device 100 receives a driving signal P from the controller 110 by the variable capacitor units Cmp and Cmn, and charges the first input end 122 and the second input end 124 based on the driving signal P (step S430). As mentioned above, the self capacitances of the variable capacitor units Cmp and Cmn can be set to be the same, and the first input end 122 and the second input end 124 can be charged to the same voltage level by the driving signal P. When the first touch electrode 132 and the second touch electrode 134 are touched, the voltage level VS of the first input end 122 will be reduced, and thus the sensing device 100 can detect the touch state of the first touch electrode 132 and the second touch electrode 134 based on the voltage difference between the first input end 122 and the second input end 124.

In another exemplary embodiment, the sensing device 100 further uses the controller 110 to control the first switch 140 for connecting the first input end 122 to the second touch electrode 134, control the second switch 150 to disconnect the second input end 124 and the second touch electrode 134, and control the third switch 160 to connect the second input end 124 to the first touch electrode 132. The sensing device 100 calculates the second touch position of the first touch electrode 132 and the second touch electrode 134 by the controller 110, to use the second touch position for adjusting the first touch position (step S440). Specifically, the controller 110 controls the switches 140 and 150 such that the first input end 122 is electrically connected to the second touch electrode 134 and the second input end 124 is electrically connected to the first touch electrode 132, to calculate the second touch position according to the method of calculating the first touch position, and the controller 110 adjusts the first touch position based on the second touch position. Since the details have been disclosed as above, further description hence is omitted for the sake of brevity.

From the aforementioned exemplary embodiments, when the sensing device 100 and the sensing method 400 herein are applied to the touch slider, the area of the circuit design of the sensing device of the touch slider can be lessened, and only a few capacitors are required for achieving touch sensing with high precision, to further decrease the layout area of the circuit and capacitors, for decreasing the corresponding size of the touch sensing product. In addition, the difficulty of the manufacturing process for controlling the self capacitances of the touch electrodes is reduced while the cost is saved since the requirement amount of the electrodes is lessened.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A sensing device, comprising:
    a comparator comprising a first input end and a second input end;
    a first switch, an end of the first switch being connected to the first input end, the other end of the first switch being connected to one of a first touch electrode and a second touch electrode which are complementary;
    a second switch, an end of the second switch being connected to the second input end, the other end of the second switch being selectively connected to the second touch electrode;
    a controller configured to control the first switch and the second switch; and
    at least one variable capacitor unit electrically connected to at least one of the first input end and the second input end, and electrically connected to the controller, wherein the variable capacitor unit is configured to receive at least one adjusting signal from the controller, and adjust an equivalent capacitance of the variable capacitor unit based on the adjusting signal;
    wherein when the first touch electrode and the second touch electrode are touched, the controller controls the first switch to connect the first input end with the first touch electrode, controls the second switch to connect the second input end with the second touch electrode, and calculates a first touch position of the first touch electrode and the second touch electrode;
    wherein the controller is configured to calculate the first touch position based on the equivalent capacitance of the variable capacitor unit.

2. The sensing device of claim 1, wherein the variable capacitor unit comprises:
    a plurality of switchable capacitors, the switchable capacitors being connected to each other in parallel, wherein one end of each of the switchable capacitors is configured to selectively receive the adjusting signal, and the other ends of the switchable capacitors are commonly connected to at least one of the first input end and the second input end.

3. The sensing device of claim 1, wherein the variable capacitor unit is configured to receive at least one driving signal from the controller, for charging at least one of the first input end and the second input end by the driving signal.

4. The sensing device of claim 1, wherein a width of the first touch electrode and a width of the second touch electrode are not uniformly distributed, and the controller is configured to calculate the first touch position based on the widths of the first touch electrode and the second touch electrode.

5. The sensing device of claim 1, wherein the controller controls the first switch to electrically connect the first input end with the first touch electrode or with the second touch electrode alternately, and controls the second switch to disconnect the second input end and the second touch electrode, for determining touch states of the first touch electrode and the second touch electrode.

6. The sensing device of claim 1, further comprising:
a third switch, an end of the third switch being connected to the second input end, the other end of the third switch being selectively connected to the first touch electrode;
wherein the controller is configured to control the first switch to connect the first input end with the second touch electrode, control the second switch to disconnect the second input end and the second touch electrode, control the third switch to connect the second input end with the first touch electrode, and calculate a second touch position of the first touch electrode and the second touch electrode, so as to adjust the first touch position based on the second touch position.

7. A sensing method, comprising:
controlling a first switch by a controller to connect a first input end of a comparator with one of a first touch electrode and a complementary second touch electrode, and controlling a second switch to selectively connect a second input end of the comparator with the second touch electrode; and when the first touch electrode and the second touch electrode are touched, controlling the first switch to connect the first input end with the first touch electrode, controlling the second switch to connect the second input end with the second touch electrode, and calculating a first touch position of the first touch electrode and the second touch electrode;

wherein the step of calculating the first touch position of the first touch electrode and the second touch electrode comprises:

receiving at least one adjusting signal from the controller by at least one variable capacitor unit, and adjusting an equivalent capacitance of the variable capacitor unit based on the adjusting signal, wherein the variable capacitor unit is electrically connected to at least one of the first input end and the second input end, and is electrically connected to the controller; and calculating the first touch position by the controller based on the equivalent capacitance of the variable capacitor unit.

8. The sensing method of claim 7, wherein the step of adjusting the equivalent capacitance of the variable capacitor unit based on the adjusting signal comprises:
selectively receiving the adjusting signal by ends of a plurality of switchable capacitors which are connected to each other in parallel, wherein the other ends of the plurality of switchable capacitors are commonly connected to at least one of the first input end and the second input end.

* * * * *